Patented May 14, 1929.

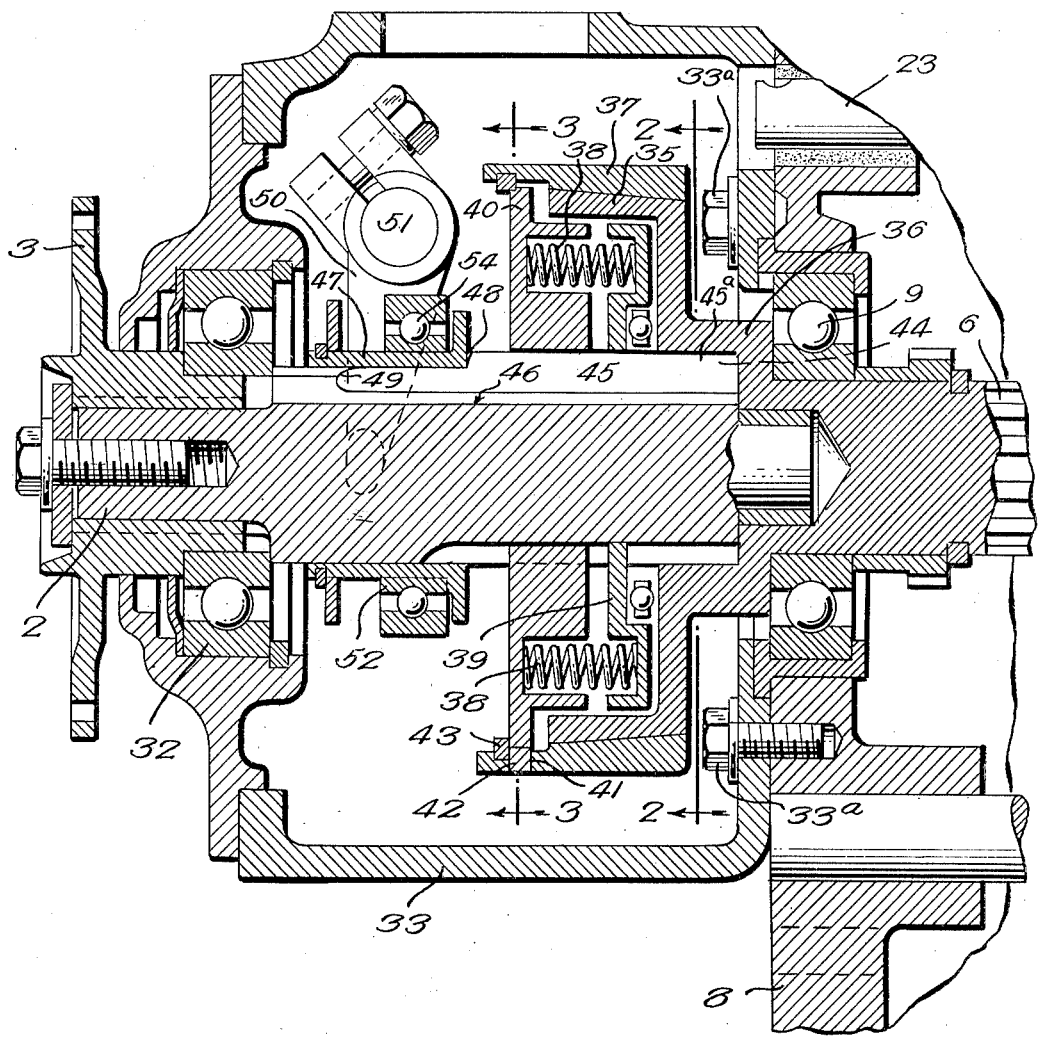

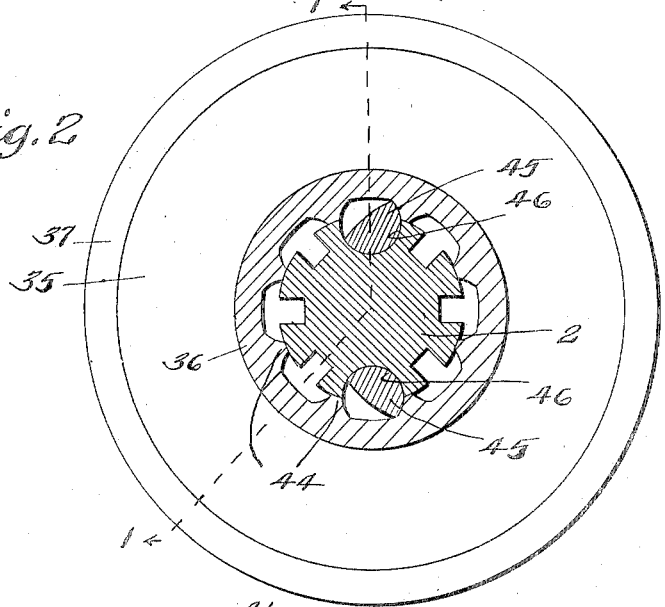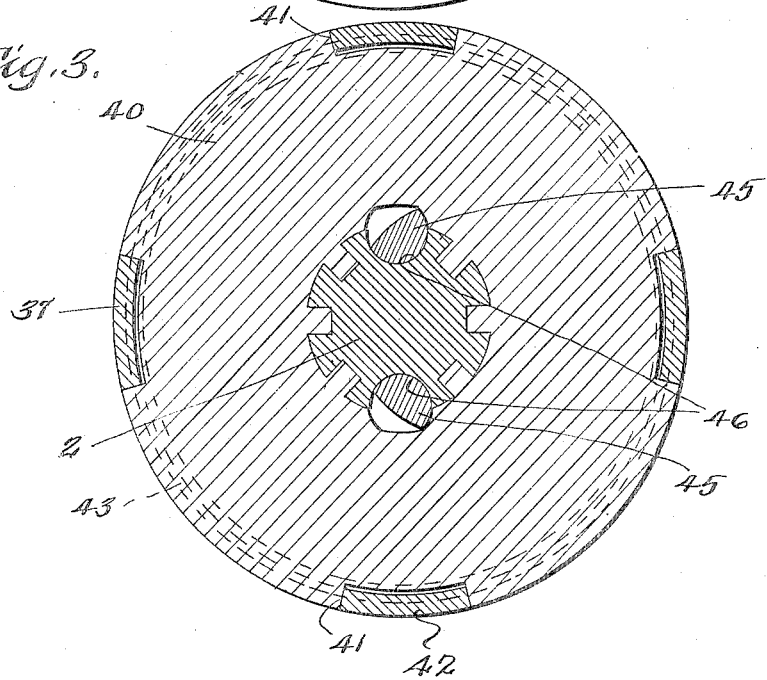

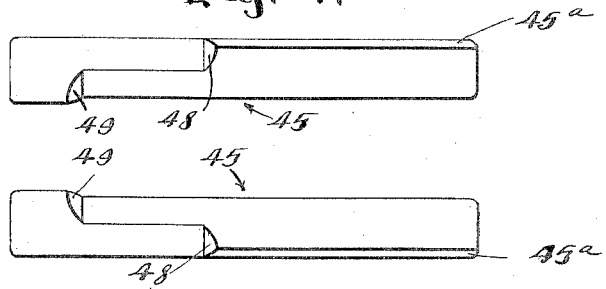
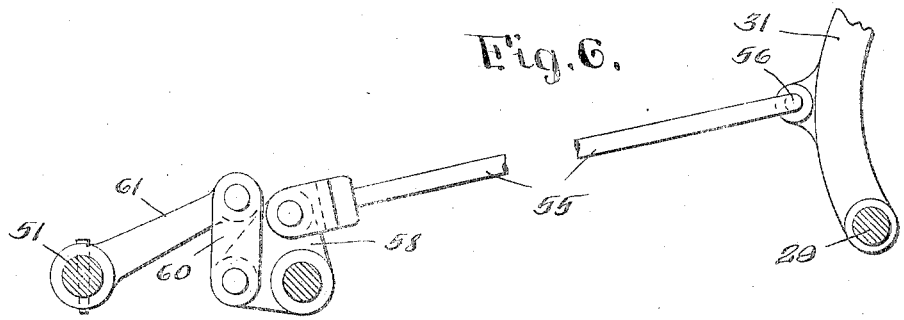
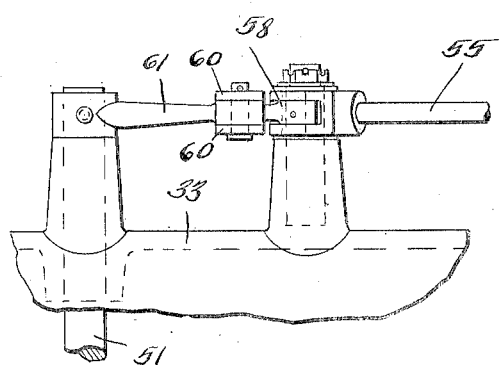

1,713,024

UNITED STATES PATENT OFFICE.

GEORGE C. CARHART, OF SYRACUSE, NEW YORK, ASSIGNOR TO THE BROWN-LIPE GEAR COMPANY, OF SYRACUSE, NEW YORK, A CORPORATION OF NEW YORK.

TRANSMISSION MECHANISM.

Application filed March 26, 1924. Serial No. 702,155.

This invention relates to motion transmission mechanisms, such as are used in motor vehicles, such mechanisms including change speed transmission gearing, and has for its object a particularly simple and efficient construction by which the rotatable members as the shafts, gears and clutches of the transmission gearing are relieved of all power tending to turn them during gear shifting operations, whereby such operations are readily effected even by an unskilled operator without clashing of the gears, and by which the motion of any two driving and driven parts is synchronized before the main clutch has been again fully engaged after each gear shifting operation or before the main clutch has been fully engaged after the vehicle has been coasting with the main clutch thrown out.

The invention consists in the novel features and in the combinations and constructions hereinafter set forth and claimed.

In describing this invention, reference is had to the accompanying drawings in which like characters designate corresponding parts in all the views.

Figure 1 is a sectional view of a transmission mechanism embodying my invention taken on line 1—1, Figure 2.

Figure 2 is a sectional view on line 2—2, Figure 1.

Figure 3 is a sectional view on line 3—3, Figure 1.

Figures 4 and 5 are detail views of the clutch keys.

Figures 6 and 7 are fragmentary elevations taken at a right angle to each other of a portion of the operating means for the rear clutches.

6 is the transmission shaft of a change speed gearing, said shaft being journalled in a suitable bearing 9 in the rear wall of the casing 8 of the gearing.

2 is a driven shaft which is arranged in axial alinement with the transmission shaft 6. The driven shaft 2 is journalled at its rear end in a suitable bearing 32 in the rear wall of a casing 33, which is secured to the transmission gear casing 8 in any suitable manner, as by screws 33ª, and this driven shaft 2 is arranged in alinement with the transmission shaft 6 and has a pilot bearing at 34 in the opposing end of the transmission shaft 6.

The friction clutch between the transmission shaft 6 and the driven shaft 2 comprises frictionally engaged clutch sections mounted on and rotatable respectively with the shafts 6 and 2 and spring means for holding the sections engaged with a predetermined amount of friction, one of the sections being shiftable against the action of the springs out of engagement with the other.

The clutch here shown is of the cone type and the section 35 mounted on the transmission shaft 6 projects within the casing 33 and, as here shown, is mounted on and formed integral with a hub 36 formed on the transmission shaft 6, and the section 37 is mounted on the shaft 2 to rotate therewith, and shiftable axially thereof, the section 37 constituting an outer drum having a conical face and the section 35 being the inner drum having a complementary conical face. The sections are held engaged by a plurality of springs 38 interposed between a spring abutment 39 rotatable with the shaft 2 and the head 40 of the clutch section 37.

The shaft 2, as here shown, is a spline shaft and the abutment 39 and the head 40 are shown as interlocked with the shaft 2.

The head 40 is shown as formed with peripheral notches 41, which receive tongues 42 on the drum portion of the section 37 and the drum portion and the head are held assembled in relation by means of a snap or lock ring 43. The friction between the sections 35 and 37 of the friction clutch is such as to permit slipping of one section relatively to the other and constructed to synchronize relative rotation of the shafts 6 and 2 when the shaft 2 is disengaged from the shaft 6. The section 37 is shiftable axially of the shaft and against the springs 38, to disengage the clutch sections.

As seen in Figure 1, the abutment 39 is provided with tongues which interlock with the periphery of the spline shaft 2.

The shafts 6 and 2 are connected by a clutch forming the subject matter of this invention and this clutch for engaging directly together, the driven shaft 2 and the transmission shaft 6, is constructed to positively connect such shafts and, as here shown, the hub 36 on the rear end of the transmission shaft is formed with internal clutch teeth or recesses 44 and the driven shaft 2 is provided with a clutch member or members adapted when operated to engage or disengage such clutch teeth 44.

As here shown, there are two clutch members, each of which is a key 45 extending lengthwise of the shaft 2 within the clutch sections 35 and 37 and arranged in grooves or keyways 46, the keys 45 being so shaped that when in their inoperative positions their teeth 45$^a$ lie entirely below the periphery of the shaft 2, and when in their operative position portions or teeth 45$^a$ project above the periphery of the shaft 2 in order to interlock with the teeth or enter the recesses 44. Usually, the grooves 46 are arc-shaped and the keys 45 are also arc-shaped and roll or rock in the grooves to project the out portions or teeth 45$^a$ thereof above the periphery of the shaft 2 or to withdraw their portions or teeth 45$^a$ below the periphery of the shaft 2, which active portions, as before stated, coact with the recesses 44 in the hub of the transmission shaft 6. There are two keys 45 arranged oppositely to each other, one being arranged to drive in one direction and the other in the opposite direction.

The means for operating or rolling the keys, comprises a collar 47 mounted on the shaft 2 and slidable axially thereof between oppositely inclined shoulders or cam faces 48 and 49 on each of the keys. When the collar 47 is shifted in one direction it engages the shoulders 48 and rolls the keys 45 out of engagement with the teeth 44 and when it is moved in the opposite direction, the collar engages the inclined faces or cams 49 and rolls the keys into engagement with the teeth 44. This collar is normally spaced from the head 40 of the shiftable clutch section 37 and, after it has been shifted into engagement with the cam faces 48 and hence rolled the keys 45 out of engagement with the teeth 44, it traverses the remaining space between it and the head 40 and hence takes up the lost motion between said collar and the head 40, and then shifts the clutch section 37 out of engagement with the section 35. Upon the reverse movement of the collar 47, the friction clutch sections 37, 35, are engaged and synchronize any relative rotation of the shafts 2 and 6 before the keys 45 are interlocked with the teeth 44, due to the collar 47 engaging the cam faces 49 on the keys.

The collar 47 is operated by means as a fork 50 mounted on a shaft 51 journalled in the case 33, the fork being arranged in an annular groove 52 formed in the collar 47. An anti-friction thrust bearing 54 is preferably arranged in one side of such groove, that is, the side on which the fork thrusts when rolling the keys 45 out of their engaging position, and when shifting the clutch section 37 out of engagement with the section 35. The shaft 51 extends to the outside of the case 33. The shaft 51 is usually operated by the main clutch pedal 31, that is, the clutch pedal for operating the main clutch of a motor vehicle.

The connection between the pedal 31 and the shaft 51 comprises a link 55 connected at 56 at its front end to the pedal 31, an angle lever 58 pivoted to the outside of the casing and to which the rear end of the link 55 is pivoted, and normally folded links 60, 61 between the angle lever and the shaft 51. The link 61 is in effect a rock arm on the shaft 51. When the pedal is depressed, the angle lever first operates to straighten the links 60, 61 and, in so doing, rocks the shaft 51 to cause the fork 50 to thrust the collar 47 to the right against the shoulders 48 of the keys 45 and hence roll the keys out of engagement with the teeth 44. During the latter part of the straightening of the links 60, 61 the collar takes up the lost motion between it and the clutch section 37 and shifts the clutch section 37 out of engagement with the section 35, so that the shaft 2 is disconnected from the shaft 6 and, while the collar 47 is taking up the lost motion, any relative rotation is permitted by the friction clutch members 35, 37.

The pedal 31 is thus operated first to partially or fully disengage the main clutch before the clutch keys 45 are operated to disengage from the clutch face of the transmission shaft 6, and the clutch keys 45 are disengaged from the teeth 44 of the shaft 6 in advance of the disengagement of the friction clutch section 37. When the clutch pedal 31 is released to let in the main clutch, the collar 47 is moved to the left and permits the springs 38 to engage the friction clutch sections 35, 37 in advance of the engaging of the keys 45 with the teeth 44, by the collar 47 acting on the inclined faces 49 of the keys 45. During the momentary interval occurring after the friction clutch sections 37, 35, are engaged, the driven shaft 2 is driven through the friction clutch sections 35, 37 and the motion of such shafts 6 and 2 synchronized before the keys 45 are rolled into their engaging position.

In operation, when it is desired to shift gears or clutches of the transmission gearing, the clutch pedal is depressed, thus disconnecting the engine shaft from the transmission gearing and also disconnecting the clutch members or keys 45 from the transmission shaft 6, and thereafter disconnecting the clutch section 37 from the clutch section 35, so that, the transmission gearing is relieved of all driving force, both the driving force of the engine and the driving force, due to the momentum of the vehicle through the propeller shaft and the driven shaft 2.

The gear shifting operation is then performed by operating the usual shifting lever of a transmission gearing, while the gears are relieved of the driving force. After the gear shifting operation is performed, the clutch pedal 31 is released, first engaging the main clutch, then engaging the friction clutch 35, 37, so that the relative rotation of the shafts 2 and 6 is synchronized, then engaging the clutch keys 45 after the relative rotation of the shafts 2 and 6 is synchronized through the friction clutch.

What I claim is:

1. In a transmission mechanism, the combination of axially alined shafts arranged end to end, one having a pilot bearing in the other, frictionally engaged clutch sections mounted on the opposing ends of said shafts and rotatable therewith, one of said sections being shiftable, one of said shafts having internal clutch teeth around and running close to the periphery of the other shaft, and the other shaft being formed with lengthwise grooves, keys in the grooves and movable therein to engage and disengage such clutch teeth, and means mounted on one of the shafts to operate the keys and the shiftable friction clutch section.

2. In a transmission mechanism, the combination of axially alined shafts arranged end to end, one having a pilot bearing in the other, frictionally engaged clutch sections mounted on the opposing ends of said shafts and rotatable therewith, one of said sections being shiftable, one of said shafts having internal clutch teeth around and running close to the periphery of the other shaft and the other shaft being formed with lengthwise grooves, keys in the grooves and movable therein to engage and disengage such clutch teeth, the keys extending lengthwise of the shaft within the friction clutch sections, and a collar slidable on one of the shafts and coacting with the keys to operate the same, and movable into engagement with the shiftable friction clutch section, the collar being spaced apart from such shifting clutch section to provide a lost motion connection between the collar and such section.

3. In a transmission mechanism, the combination of axially alined shafts, frictionally engaged clutch sections mounted on the opposing ends of said shafts and rotatable therewith, one of said shafts having internal clutch teeth around and running close to the periphery of the other shaft and the other shaft being formed with lengthwise grooves, rotatable keys in the groves and means slidable axially of one of the shafts to rotate the keys into and out of position to interlock with said teeth and to shift one of the clutch sections out of engagement with the other and means tending to hold the shiftable friction clutch section into engagement with the other clutch section.

4. In a transmission mechanism, the combination of axially alined shafts frictionally engaged clutch sections mounted on the opposing ends of said shafts and rotatable therewith, one of said sections being shiftable axially and means tending to shift it axially to engage it with the other section, one of the shafts having internal clutch teeth around and running close to the periphery of the other shaft, rotatable keys associated with the latter shaft and rotatable into and out of position to engage with said teeth and a collar slidable axially of the latter shaft and coacting with the keys to rotate them and also to shift the shiftable clutch section out of engaging position when moved in one direction.

In testimony whereof, I have hereunto signed my name, at Syracuse, in the county of Onondaga, and State of New York, this 21st day of March, 1924.

GEORGE C. CARHART.